May 14, 1935.  H. W. RUPPLE  2,001,586
HEAD SLIDE FOR AUTOMATIC MACHINE TOOLS
Filed April 5, 1932  4 Sheets-Sheet 1

INVENTOR:
HARRY W. RUPPLE
Kwin Hudson & Kent
ATTORNEYS

May 14, 1935. H. W. RUPPLE 2,001,586
HEAD SLIDE FOR AUTOMATIC MACHINE TOOLS
Filed April 5, 1932 4 Sheets-Sheet 2

INVENTOR:
HARRY W. RUPPLE
ATTORNEYS.

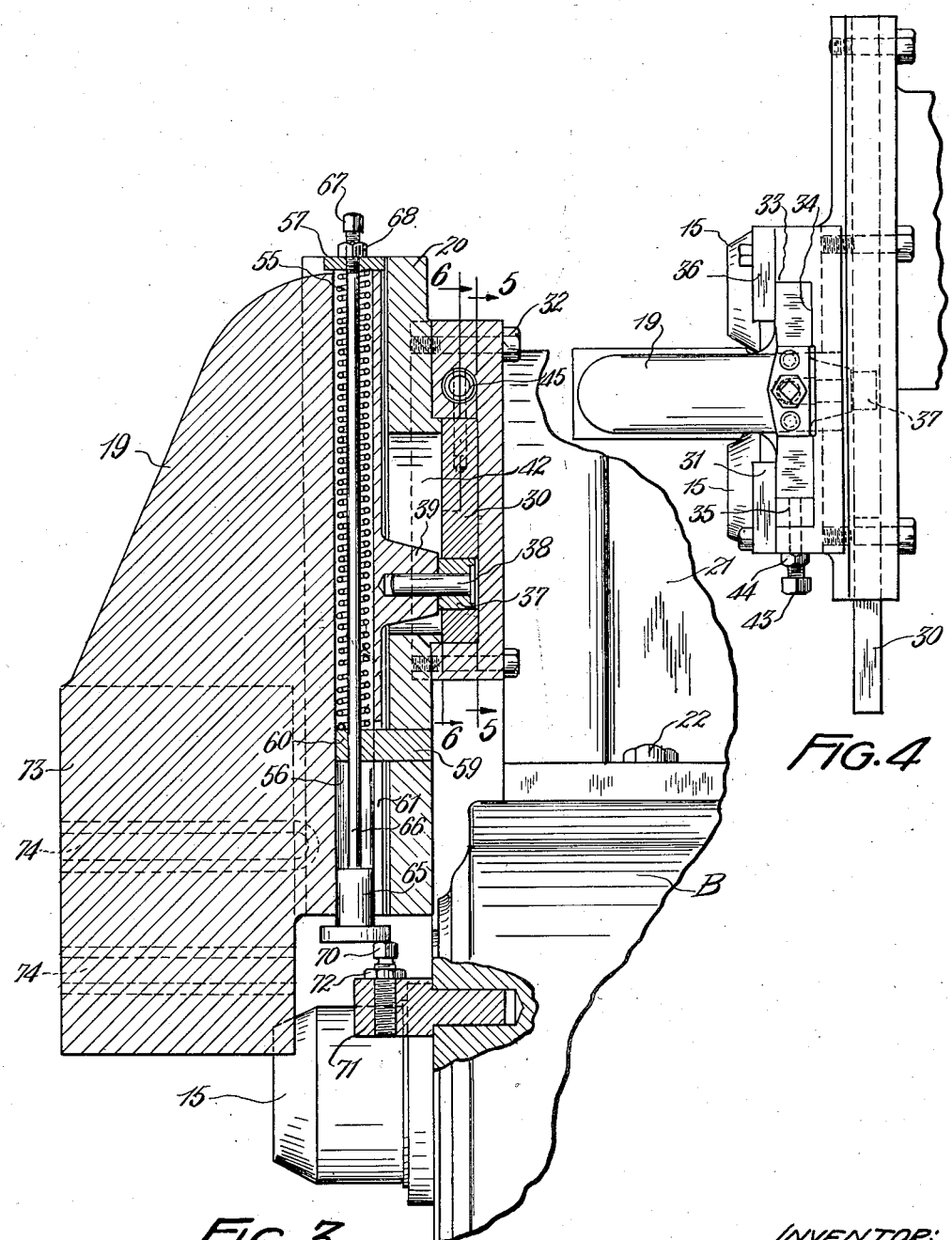

Patented May 14, 1935

2,001,586

UNITED STATES PATENT OFFICE 2,001,586

HEAD SLIDE FOR AUTOMATIC MACHINE TOOLS

Harry W. Rupple, Shaker Heights, Ohio, assignor to The Cleveland Automatic Machine Company, Cleveland, Ohio, a corporation of Ohio Application April 5, 1932, Serial No. 603,406

2 Claims. (Cl. 29—57)

The present invention relates to automatic metal working machines of the type commonly referred to as automatic screw machines and more particularly to the tool slide construction of such machines. In machines of this general type a plurality of work blanks are carried by rotatable spindles mounted in an indexible spindle turret and operated upon by a plurality of tools carried by a main slide and/or one or more cross slides, all of which are supported by the bed of the machine.

As is well understood in the art, the number of operations that can be performed on a blank at any station is limited, among other things, by the number of tools that can be operated at the station. The tools carried by the main slide of the machine are supplemented in the lower stations by tools mounted on the horizontally movable cross slides, and it is an object of the present invention to supplant the tools carried by the main tool slide in the upper stations by radially movable slides carried by the spindle head adjacent to or between the upper spindles, and reciprocated toward and from the spindles in predetermined timed relation with reference to the other operation of the machine.

Another object of the invention is the provision of a head slide for an automatic machine tool of the type referred to which will be rugged in construction and free from clatter, etc., in operation.

Other objects and advantages of the invention will be apparent to those skilled in the art from the following description of the preferred embodiment of the invention described with reference to the accompanying drawings, in which Fig. 1 is a section through a multiple spindle automatic metal working machine embodying the present invention with parts broken away, looking toward the spindle turret;

Fig. 3 is a section on the line 3—3 of Fig. 1;

Fig. 4 is an elevation of the head slide shown in Fig. 1 looking in the direction of the arrow A;

Similar reference characters designate corresponding parts throughout the several views.

Figure 1:
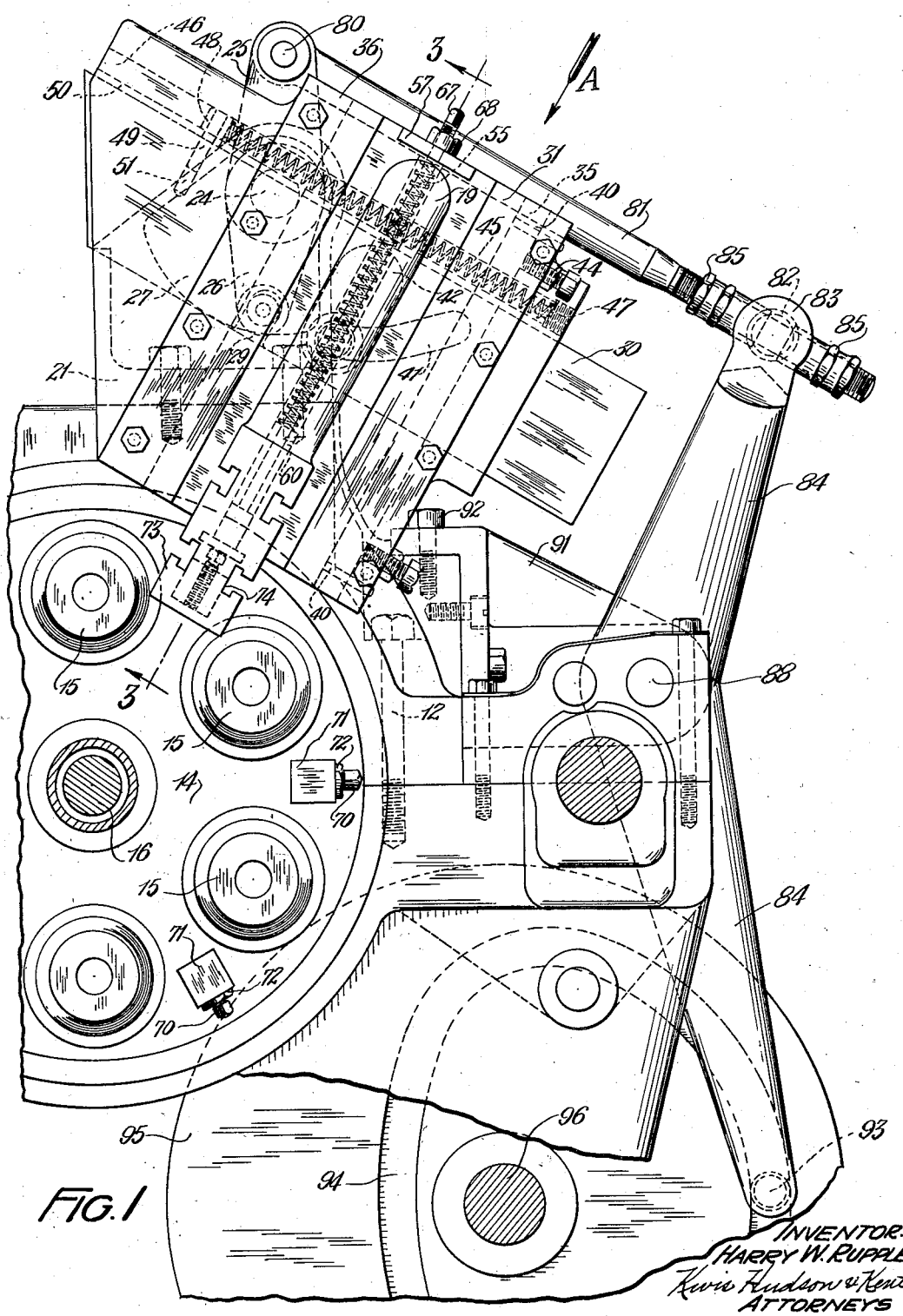
Figure 2:
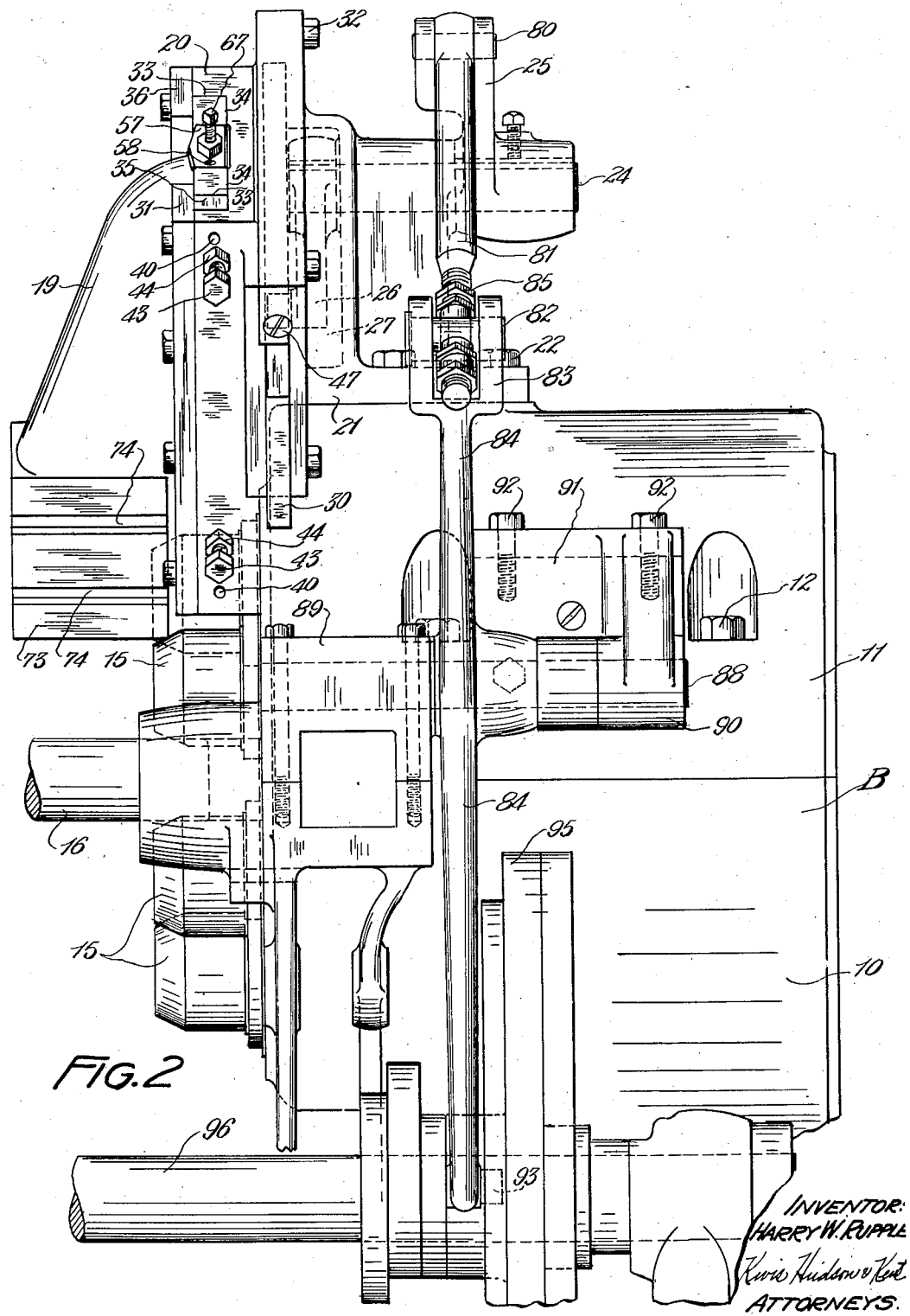
Fig. 2 is a rear elevation of the spindle head shown in Fig. 1, looking from the right as viewed in Fig. 1.

The machine of which the work spindle head alone is illustrated is any well known type of automatic machine and may be found in a plurality of different embodiments. A complete illustration and description of the machine is considered unnecssary for an understanding of the present invention. The spindle head, designated in general by the reference character B, comprises a boss 10 formed integral with the bed of the machine and a cap 11 bolted thereto as by the bolts 12. A spindle turret 14, rotatably supported in a suitable longitudinal aperture in the spindle head, and adapted to be intermittently indexed, carries a plurality of rotatable spindles 15, in the present instance six, equally spaced about the axis thereof and adapted to be moved from station to station as the spindle turret is indexed. The spindles 15 are driven from a drive shaft 16 of the machine in a manner well known in the art. The cross-slides adapted to carry tools to supplement those in the lower station of the main tool slide are not shown but are well known in the art.

As previously stated, applicant's invention relates to a tool slide adapted to support tools adjacent the upper stations of the machine and supplement the tools in the upper stations of the main tool slides. For this purpose, in the preferred embodiment of the invention illustrated, a tool slide 19 is slidably supported between the two upper rear spindles by a member 20 attached to a bracket 21 bolted as by the bolts 22 to a pad formed on the cap 11 of the spindle head B.

Figure 5:
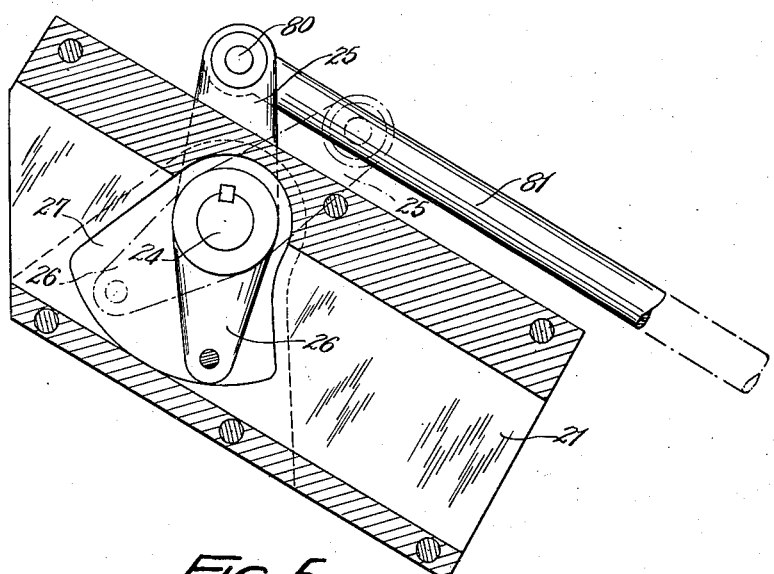
Fig. 5 is a section on the line 5—5 of Fig. 3.

A short shaft 24 rotatably supported in suitable bearings in the bracket 21 carried crank arms 25 and 26 keyed thereto at opposite ends thereof. A suitable recess 27 is formed in the bracket 21 to accommodate the crank arm 26 which carries a roller 28 adapted to engage in a cam slot 29 formed in a slide bar 30 slidably supported in the bracket 21 to move normal to the direction of movement of the tool slide 19. The throw of the crank arm 26 is indicated in dotted lines in Figs. 5 and 6.

The member 20 is attached to the bracket 21 by bolts 32 and has suitable guideways 33 and 34 formed therein in which the tool slide 19 is slidably supported. Plates 31 and 36 bolted or otherwise secured to the face of the member 20 are employed to retain the slide 19 in position in the guideways 33 and 34. If desired, the plates 31 and 36 may be formed integral with the member 20 but are preferably attached thereto, as illustrated, to facilitate machining and assembly. Wear, etc., in the guides which support the slide 19 is taken up by means of the wear plate 35 retained in the member 20 by means of dowel pins 40 and adjusted relative thereto by bolts 43. The bolts 43 are held in adjusted position by lock nuts 44. The tool slide 19 is moved radially of the spindle turret upon reciprocation of the slide bar 30 by means of a cam roller 37, supported on a pin 38 fixed to a projection 39 on the tool slide 19 projecting through a slot 42 in the member 21 which engages in a cam slot 41 in the slide bar 30.

Figure 6:
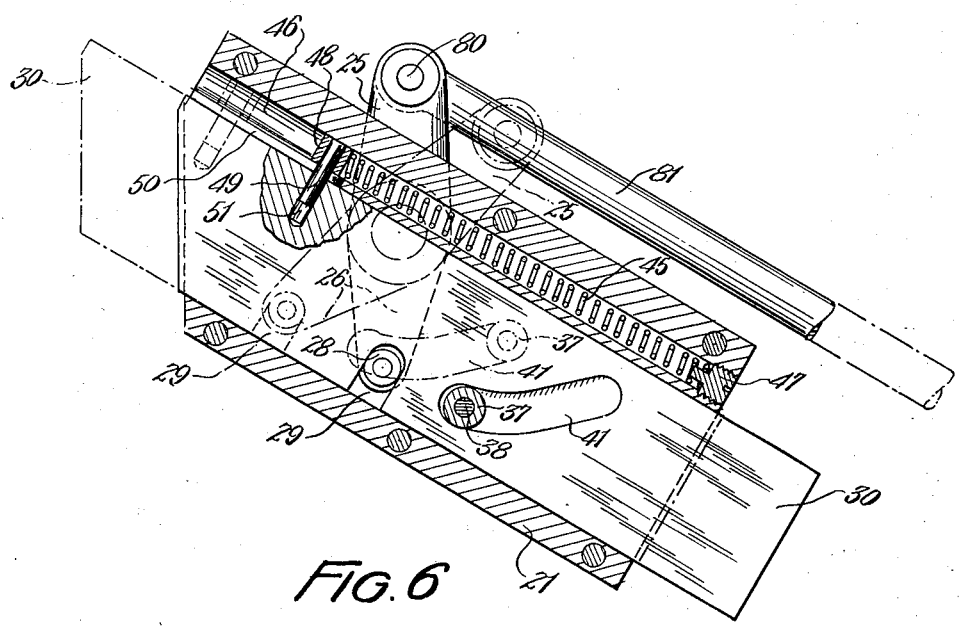
Fig. 6 is a section approximately on the line 6—6 of Fig. 3.

The slide bar 30 is continuously urged towards the left as viewed in Figs. 1 and 6 by a coil spring 45 positioned in a circular aperture 46 formed in the bracket 21 above the slide bar 30. The spring 45 is compressed between a plug 47 threaded into the bracket 21 at one end of the aperture 46 and a circular plug 48 on a pin 49 carried by the slide bar 30 and projecting through a slot 50 into the aperture 46 behind said spring. The pin 49 may be secured in the slide bar 30 in any suitable manner, and as illustrated, it is retained in a hole 51 drilled therein, by a drive fit.

The tool slide 19 is continuously urged in a direction away from the spindle turret by a coil spring 55 positioned in a suitable aperture 56 drilled or otherwise formed in the tool slide and compressed between a plate 57 attached to the top of the slide, as by the screws 58 and a pin 59 provided with an enlarged head 60 secured in the member 20 and projecting through a slot 61 in the tool slide with the head 60 positioned in the aperture 56 below the spring 55.

An adjustable stop 65 it slidably positioned in the lower end of the aperture 56 and adjusted therein by means of a rod 66 attached thereto in any suitable manner and threaded at its upper end in the plate 57. A hex head 67 formed on the end of the rod 66 provides means whereby it may be turned to adjust the stop 65. A lock or jam nut 68 retains the rod 66 in any adjusted position. The rod 66 projects through a suitable aperture or eye in the head 60 of the pin 59 and through the center of the spring 55.

The stop 65 is adapted to engage an adjustable stop 70 threaded into a member 71 secured in a suitable aperture in the spindle turret. A lock nut 72 retains the stop 70 in any adjusted position. Similar stops designated by the same reference characters are fixed to the spindle turret between each adjacent spindle. The tool slide 19 is provided with a machined surface 73 and T slots 74 to facilitate the attachment of tools thereto.

The crank 25 is pivotally connected by means of a pin 80 secured in a yoke formed on the free end thereof to one end of a rod 81, the other end of which extends through an aperture in a pin 82 pivotally supported in a yoke 83 formed on the upper end of a bell crank lever or walking beam 84. The operating length of the rod 81 can be adjusted by means of nuts 85 threaded thereon at opposite sides of the pin 82. The bell crank lever 84 is rotatably supported on a short shaft 88 supported at one end in a boss 89 integral with the cap 11 and at the other end in a boss 90 formed on a bracket 91 secured to the cap 11 as by the bolts 92. The lower end of the bell crank lever 84 carries a cam roller 93 engageable in a cam track 94 on a cam drum 95 on the main cam shaft 96 of the machine.

From the above description of the preferred embodiment of the invention, it will be apparent that the tool slide 19 will be reciprocated radially of the spindle turret in predetermined timed relation to the other operations of the machine upon rotation of the cam disk 95. Lost motion in the operating mechanism of the tool slide and clatter thereof in operation are eliminated or reduced to a minimum by the compression springs 45 and 55. A second tool slide similar in construction to the one illustrated and described and operated from a cam on the main cam shaft in a like manner, may be placed on the front of the spindle head, the left hand side as viewed in Fig. 1, between the corresponding spindles at the front of the machine.

The invention has been illustrated and described as applied to a six spindle machine, but it is equally applicable to any multiple spindle machine, such as a four or five spindle machine. I do not wish to be limited to the particular construction shown as the invention is capable of being embodied in various constructions. This application is intended to cover any and all variations, adaptations or uses thereof as come within the knowledge or customary practice in the art to which it appertains, and I particularly point out and claim as my invention:

I claim:

1. In a machine of the character described, the combination of a frame, a spindle rotatably supported by said frame, a tool slide slidably supported by said frame adjacent said spindle, a linearly reciprocable member slidably supported by said frame, an arcuate cam groove in said member, a cam roller carried by said slide in engagement in said cam groove, a shaft rotatably supported by said frame, a lever fixed to said shaft and operatively connected to said member, a walking beam supported by said frame, a lever on said shaft adjustably connected to one end of said walking beam, cam means operatively connected to the other end of said walking beam for controlling the movement of said slide, and resilient means for continuously urging said tool slide in one direction.

2. In a machine of the character described, the combination of a frame, a spindle rotatably supported by said frame, a tool slide slidably supported by said frame adjacent said spindle, resilient means continuously urging said slide in a direction away from said spindle, a linearly reciprocable member slidably supported by said frame, resilient means for continuously urging said member in one direction, an arcuate cam groove in said member, a cam roller carried by said slide in engagement in said cam groove, a shaft rotatably supported by said frame, a lever fixed to said shaft and operatively connected to said member, a walking beam supported by said frame, a lever on said shaft adjustably connected to one end of said walking beam, and cam means operatively connected to the other end of said walking beam for moving the same.

HARRY W. RUPPLE.